United States Patent
Griffiths et al.

[15] 3,643,917
[45] Feb. 22, 1972

[54] PLASTIC DRAIN COCK
[72] Inventors: Graham Ernest Griffiths, Horsham; Roger Keith Geiger, Shoreham; John Walter Miles, East Grinstead, all of England
[73] Assignee: Shipston Engineering Company Limited
[22] Filed: May 25, 1970
[21] Appl. No.: 39,957

[52] U.S. Cl. ........................251/215, 137/329.06
[51] Int. Cl. ........................................F16k 31/50
[58] Field of Search............137/321, 329.06; 251/215, 144, 251/155

[56] References Cited

UNITED STATES PATENTS

| 1,397,220 | 11/1921 | Lord | 251/144 X |
| 1,465,952 | 8/1923 | Smith et al. | 251/144 |
| 1,753,833 | 4/1930 | Mueller | 251/215 |
| 1,941,482 | 1/1934 | Mollberg | 251/215 |
| 2,983,385 | 5/1961 | Botstiber | 137/329.06 X |

Primary Examiner—Henry T. Klinksiek
Assistant Examiner—David R. Matthews
Attorney—Lawrence E. Laubscher

[57] ABSTRACT

Drain cock means including threadably connected first and second members, characterized in that the first member contains a first passage that is open at one end and is closed at the other end by the second member, said second member having a sealing portion adapted to engage the first member to close the drain cock. The second member includes also a spigot-forming portion that extends through said first passage and includes an enlarged end engageable with said first member to prevent or hinder the members from being completely detached from each other.

3 Claims, 2 Drawing Figures

Graham E. Griffiths
Roger K. Geiger
John W. Miles
INVENTORS

BY
Lawrence E. Laubscher
ATTORNEY

3,643,917

PLASTIC DRAIN COCK

The present invention relates to a drain cock.

According to the invention there is provided a drain cock comprising first and second members one of which is adjustably screwed on to the other and is prevented or hindered from being completely detached therefrom, said first member being formed with a first passage which is open at one end and is closed by said second member at the other end, said second member extending at least partly along said passage and having a portion engageable with a sealing surface of said first member so as to shut off or prevent fluid flow through the drain cock, a second passage in said second member being open at one end and communicating at its other end with said first passage, and wherein a spigot-forming part of said second member extends through said first passage and has an enlarged end engageable with said first member to prevent or hinder said first and second members from being completely detached from one another.

Figure 1:
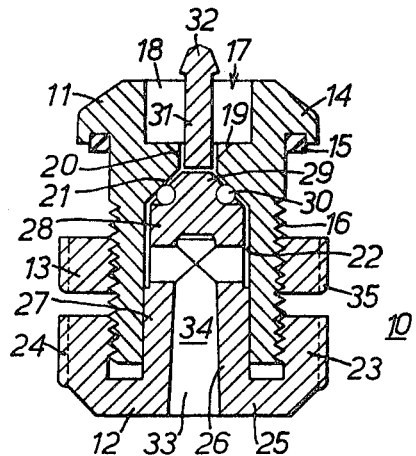
Figure 2:
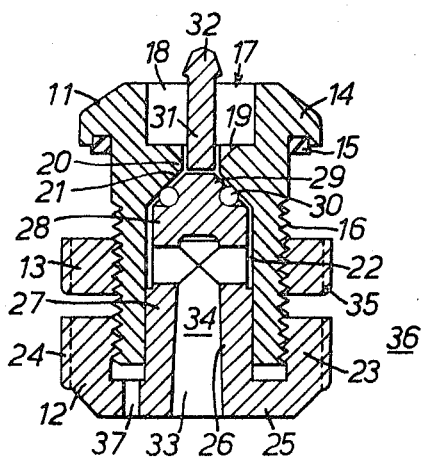

The invention will be described by way of example with reference to the accompanying drawings, wherein:

FIG. 1 is a sectional elevation of a drain cock in accordance with the invention; and FIG. 2 is a sectional elevation of a modified drain cock in accordance with the invention.

The drain cock 10 shown in FIG. 1 comprises a body member 11, a plug member 12 and a locking ring 13, each formed of a synthetic plastic material.

The body member 11 is cylindrical and is adapted to be inserted through an aperture in a filter bowl or other fluid container (not shown), being formed with a flange 14 fitted with a resilient square section sealing ring 15. The body member 11 is externally screw threaded at 16 for the locking ring 13, which is internally screw threaded, to clamp the flange 14 against the filter bowl. A passage 17 extends through the body member 11, comprising an upper portion 18 which is hexagonal in cross section, to fit a key (not shown) for holding the body member 11 when screwing and unscrewing the locking ring 13. The passage 17 also comprises a downwardly tapering frustoconical portion 19 with interfering sections leading from passage portion 18 to a narrow neck portion 20 of passage 17, and a downwardly flared portion 21 leading from the neck portion 20 to a lower cylindrical passage portion 22. The downwardly flared passage portion 21 forms a sealing surface for the plug member 12.

The plug member 12 comprises an internally screw-threaded ring portion 23, the exterior 24 of which is knurled, screwed on to body member 11 and joined at its lower end by a flange 25 to a cylindrical stem 26. The stem 26 is formed with a lower portion 27 which makes a close sliding fit with the passage portion 22, and an upper portion 28 of less diameter which leaves a clearance therewith. The plug member 12 also comprises an upwardly tapering portion 29 fitted in an annular recess with a resilient O-section sealing ring 30 which cooperates with the sealing surface formed by passage portion 21. Finally, plug member 12 comprises an upper spigot 31, at the top end of which there is an enlargement 32. If the ring portion 23 is completely unscrewed from the body member 11, the enlargement 32 engages the sides of the passage portion 19 to prevent plug member 12 from becoming detached from the body member 11 while the interfering sections prevent this passage from sealing thus allowing air pressure to help cause separation of body and plug member. A passage 33 extends axially from the bottom end of plug member 12 to a transverse passage 34 in the upper portion 28, which communicates with passage 17 beneath the sealing ring 30.

As already mentioned the locking ring 13 serves to clamp flange 14 against the filter bowl or other fluid container, and is externally knurled at 35 so that a grip can be obtained.

In use, the drain cock 10 is opened by taking manual hold of ring portion 23 and unscrewing plug member 12 from body member 11, so that fluid can flow down passage 17 around the spigot 31 and sealing ring 30, and thence through passages 34 and 33. Fluid is restrained from flowing between lower portion 27 of the stem 26 and body member 11 by the closing sliding fit between them and by a partial seal afforded by the screw threaded ring portion 23 and body member 11. Thus, a user can avoid contamination of the hands by fluid when using the drain cock 10.

With drain cock 10, it may be found that pressure leakage takes place between the external thread 16 and the internal thread of the plug member 12 due to the clearance between the lower portion of the plug member 27 and the internal bore of the body member 11. It appears that if the fit between these two parts is decreased to the point where leakage ceases, then the manufacture of the parts would become very difficult, while additionally, it would be difficult to turn the plug member 12.

The modified drain cock 36 shown in FIG. 2 is generally similar to the drain cock 10 shown in FIG. 1. The drain cock 36 differs from drain cock 10, however, in having a passage 37 in flange 25. It is believed that passage 37, which is in the form of a hole drilled through flange 25, causes all discharge to be directed downwardly, whether through passage 33 or through passage 37.

We claim:

1. A drain cock adapted for mounting in the drain aperture of a fluid container, comprising first (11) and second (12) threadably connected members formed of synthetic plastic material, said first member containing a first longitudinal passage (17) open at one end and closed at the other end by said second member, said second member extending along said passage and containing a second passage (33) that is open at one end and communicates at its other end with said first passage, said second member being operable to engage a sealing surface on said first member to prevent fluid flow from said first passage to said second passage;

said second member including a spigot portion (31) extending through said first passage and terminating at its free end in an enlarged extremity (32), said enlarged extremity being of such size relative to said first passage that it is engageable with said first member to prevent said first and second members from being completely detached from each other.

2. A drain cock adapted for mounting in the drain aperture of a fluid container, comprising a cylindrical first member (11) containing a longitudinal through passage (20) counterbored at one end to define an enlarged passage portion (22) having an end wall defining an annular sealing surface (21), said first member having at said one end an externally threaded surface (16); and a second member (12) having at one end an annular flange portion (23) arranged concentrically about and threadedly connected with said externally threaded surface of said first member, said second member including a cylindrical stem portion (26) that extends longitudinally within said enlarged passage portion and terminates at its free extremity in an end surface adapted for sealing engagement with said sealing surface, whereby upon rotation of said second member in alternate directions relative to said first member, said stem portion is axially displaced between closed and open positions, respectively, relative to said sealing surface, said stem portion containing a passage (33) that is open at one end and communicates at its other end with the longitudinal passage in said first member only when said stem portion is in the open position relative to said sealing surface, said second member including also a spigot portion (31) of reduced diameter that extends from the free end of said cylindrical stem portion through said longitudinal passage in said first member, said spigot portion terminating at its free extremity an enlargement (32) that prevents separation of said first and second members when said cylindrical stem portion is in the open position.

3. A drain cock as defined in claim 2, wherein said first and second members are each formed of a synthetic plastic material; wherein said sealing surface and the corresponding end portion of said cylindrical stem are flared and have a generally conical configuration; wherein O-ring means are arranged for compression between said sealing surface and the corresponding end surface of said cylindrical stem; and further wherein said second member includes a vent passage (37) that is open at one end and communicates at its other end with the annular space between said annular flange portion and said cylindrical stem portion.

* * * * *